United States Patent
Kersting

(10) Patent No.: US 8,152,668 B2
(45) Date of Patent: Apr. 10, 2012

(54) ELECTRIC VARIABLE TRANSMISSION FOR HYBRID ELECTRIC VEHICLES WITH TWO FORWARD MODES AND FOUR FIXED GEARS

(75) Inventor: Klaus Kersting, Birmingham, MI (US)

(73) Assignees: Chrysler Group LLC, Auburn Hills, MI (US); Daimler AG, Stuttgart (DE)

( * ) Notice: Subject to any disclaimer, the term of this patent is extended or adjusted under 35 U.S.C. 154(b) by 834 days.

(21) Appl. No.: 12/113,976

(22) Filed: May 2, 2008

(65) Prior Publication Data
US 2009/0275437 A1    Nov. 5, 2009

(51) Int. Cl.
    *F16H 3/72*    (2006.01)
(52) U.S. Cl. .......................................... 475/5
(58) Field of Classification Search ............. 74/325, 74/331, 329, 339; 475/207, 302, 208, 209
    See application file for complete search history.

(56) References Cited

U.S. PATENT DOCUMENTS

| | | | |
|---|---|---|---|
| 7,306,534 B2 * | 12/2007 | Bucknor et al. | 475/5 |
| 7,387,586 B2 * | 6/2008 | Raghavan et al. | 475/5 |
| 7,918,756 B2 * | 4/2011 | Goldschmidt et al. | 475/5 |
| 2003/0078126 A1 | 4/2003 | Holmes et al. | |
| 2006/0276288 A1 * | 12/2006 | Iwanaka et al. | 475/5 |
| 2007/0042852 A1 * | 2/2007 | Bucknor et al. | 475/5 |
| 2007/0270262 A1 * | 11/2007 | Raghavan et al. | 475/5 |

* cited by examiner

*Primary Examiner* — David D Le
*Assistant Examiner* — David J Hlavka
(74) *Attorney, Agent, or Firm* — Ralph E. Smith

(57) ABSTRACT

The present disclosure provides a power split transmission with two Electric Variable Transmission (EVT) modes and four fixed gears for use in hybrid electrical vehicles (HEV). The present disclosure utilizes two electric motors ("E-motors"), an engine, three planetary gear sets, and four selectively engageable clutches. The clutches are engaged in different combinations to engage the different gears and EVT modes. In the four fixed gears, power is transmitted only on the mechanical path for the highest transmission efficiency. In the two EVT modes, a part of the power is transmitted electrically. Alternatively, the E-motors can be located in the middle integrated with the transmission design. Advantageously, the present invention works with lower component speeds than existing two-mode hybrid transmissions. This can be achieved with a front E-motor design enabling modularity and also with a center E-motor design.

19 Claims, 4 Drawing Sheets

ELECTRIC VARIABLE TRANSMISSION FOR HYBRID ELECTRIC VEHICLES WITH TWO FORWARD MODES AND FOUR FIXED GEARS

FIELD OF THE DISCLOSURE

The present disclosure relates generally to vehicle transmissions, and more specifically, the present disclosure relates to a power split transmission capable of two Electric Variable Transmission (EVT) modes and four fixed gears for hybrid electrical vehicles (HEV).

BACKGROUND OF THE DISCLOSURE

A Power Split Transmission (PST) (also known as an Electric Variable Transmission (EVT)) is one type of transmission used for Hybrid Electric Vehicles (HEV). Power split transmissions utilize two electric motors ("E-motors") and require completely new transmission designs over conventional transmissions and existing HEV transmissions with a single E-motor. Power split transmissions utilize epicyclic differential gearing (i.e., planetary gear sets) in a way that a part of the power of the internal combustion engine is transmitted through a mechanical path to the output, and another part is transmitted on an electrical path. The electrical path, includes the two E-motors, one of them operating as a motor, and the other as a generator. By varying the speeds of the E-motors, variable transmission ratios are obtained.

Typically, the PST allows no carry over of parts from conventional transmissions resulting in large development costs. However, HEVs with PSTs provide improved fuel economy over traditional series and parallel hybrids because the E-motors not only boost or regenerate during braking, but also drive in variable ratios. Those operations are done in EVT modes. Conventional geared transmissions have a certain number (e.g., four to seven) of gears with fixed ratios. Variable ratios in the EVT modes allow the engine to operate near the best efficient load point. In existing HEV PSTs, high-power E-motors and power electronics are required in order to cover full load engine operation. Existing power split transmissions do not include very low power split ratios, four well-distributed gears, and a front E-motor design.

BRIEF SUMMARY OF THE DISCLOSURE

In various exemplary embodiments, the present disclosure provides a power split transmission with two Electric Variable Transmission (EVT) modes and four fixed gears for use in hybrid electrical vehicles (HEV). The present disclosure utilizes two electric motors ("E-motors"), an engine, three planetary gear sets, and four selectively engageable clutches. The clutches are engaged in different combinations to engage the different gears and EVT modes. In the four fixed gears, power is transmitted only on the mechanical path for the highest transmission efficiency. In the two EVT modes, a part of the power is transmitted electrically. Alternatively, the E-motors can be located in the middle integrated with the transmission design. Advantageously, the present invention works with lower component speeds than existing two-mode hybrid transmissions. This can be achieved with a front E-motor design enabling modularity and also with a center E-motor design.

In an exemplary embodiment of the present disclosure, an electric variable transmission with two forward modes and four fixed gears includes a first, second, and third planetary gear set, wherein the first, second, and third planetary gear sets are interconnected, an input shaft connected to the second planetary gear set, a first electric motor connected to second planetary gear set, a second electric motor connected to the first planetary gear set, a transmission housing connected to the first planetary gear set through a first selectively engageable brake and to the third planetary gear set through a second selectively engageable brake, a first selectively engageable clutch connected within the first planetary gear set, a second selectively engageable clutch connected within the third planetary gear set, and an output shaft connected to the third planetary gear set. The first and third planetary gear sets include a simple planetary gear set, and wherein the second planetary gear set includes a compound planetary gear set. The first and second electric motors are disposed in front of the first, second, and third planetary gear sets. The electric variable transmission includes two electric variable transmission modes and four fixed gears, and the two electric variable transmission modes and four fixed gears are selectively engageable through the first and second selectively engageable brakes and the first and second selectively engageable clutches.

The first planetary gear set includes a first sun gear, a first ring gear, and a first planetary pinion rotatably mounted on a first planetary carrier, wherein the first planetary pinion is disposed in a meshing relationship with the first sun and first ring gears. The second planetary gear set includes a second sun gear, a second ring gear, and second planetary pinions rotatably mounted on a second planetary carrier, wherein the second planetary pinions are disposed in a meshing relationship with the second sun and second ring gears. The third planetary gear set includes a third sun gear, a third ring gear, and a third planetary pinion rotatably mounted on a third planetary carrier, wherein the third planetary pinion is disposed in a meshing relationship with the third sun and third ring gears.

The connections in the electric variable transmission include the input shaft connected to the second planetary carrier, the first electric motor connected to the second sun gear, the second electric motor connected to the first sun gear, the first sun gear connected to the transmission housing through the first selectively engageable brake, and to the first ring gear through the first selectively engageable clutch, the first ring gear connected to the second ring gear, the first planetary carrier connect to the second planetary carrier, the second ring gear connected to the output shaft through the second selectively engageable clutch, the second planetary carrier connected to the input shaft, the third sun gear connected to the transmission housing through the first selectively engageable brake, the third ring gear connected to the transmission housing through the second selectively engageable brake, and the third planetary carrier connected to the output shaft.

In another exemplary embodiment of the present disclosure, an electric variable transmission with two forward modes and four fixed gears includes a first, second, and third planetary gear set, wherein the first, second, and third planetary gear sets are interconnected, an input shaft connected to the third planetary gear set, a first electric motor connected to the third planetary gear set, a second electric motor connected to the first and second planetary gear sets, a transmission housing connected to the first planetary gear set through a first and second selectively engageable brake, a first selectively engageable clutch connected within the second planetary gear set, and an output shaft connected to the first planetary gear set and to the third planetary gear set through a second selectively engageable clutch. The first and second planetary gear sets include a simple planetary gear set, and wherein the third planetary gear set includes a compound planetary gear set. The first and second electric motors are disposed in front of the first, second, and third planetary gear sets. The electric variable transmission includes two electric variable transmission modes and four fixed gears, and the two electric variable transmission modes and four fixed gears are selectively engageable through the first and second selectively engageable brakes and the first and second selectively engageable clutches.

The first planetary gear set includes a first sun gear, a first ring gear, and a first planetary pinion rotatably mounted on a first planetary carrier, wherein the first planetary pinion is disposed in a meshing relationship with the first sun and first ring gears. The second planetary gear set includes a second sun gear, a second ring gear, and a second planetary pinion rotatably mounted on a second planetary carrier, wherein the second planetary pinion is disposed in a meshing relationship with the second sun and second ring gears. The third planetary gear set includes a third sun gear, a third ring gear, and third planetary pinions rotatably mounted on a third planetary carrier, wherein the third planetary pinions are disposed in a meshing relationship with the third sun and third ring gears.

The connections in the electric variable transmission include the input shaft connected to the third planetary carrier, the first electric motor connected to the third sun gear, the second electric motor connected to the first sun gear, the first sun gear connected to the second sun gear, the second ring gear through the first selectively engageable clutch, and the transmission housing through the first selectively engageable brake, the first ring gear connected to the transmission housing through the second selectively engageable brake, the first planetary carrier connected to the output shaft, the second sun gear connected to the first sun gear and to the second ring gear through the first selectively engageable clutch, the second ring gear connected to the third ring gear, the second planetary carrier connected to the third planetary carrier, and the third ring gear connected to the output shaft through the second selectively engageable clutch.

In yet another exemplary embodiment of the present disclosure, an electric variable transmission with two forward modes and four fixed gears utilizing a Ravigneaux-type planetary gear set includes a Ravigneaux-type planetary gear set, a simple planetary gear set, an input shaft connected to the Ravigneaux-type planetary gear set, a first electric motor connected to the Ravigneaux-type planetary gear set, a second electric motor connected to the Ravigneaux-type planetary gear set and the simple planetary gear set, a transmission housing connected to the simple planetary gear set through a first and second selectively engageable brake, a first selectively engageable clutch connected within the Ravigneaux-type planetary gear set, and an output shaft connected to the simple planetary gear set and to the Ravigneaux-type planetary gear set through a second selectively engageable clutch. The electric variable transmission includes two electric variable transmission modes and four fixed gears; and the two electric variable transmission modes and four fixed gears are selectively engageable through the first and second selectively engageable brakes and the first and second selectively engageable clutches.

The Ravigneaux-type planetary gear set includes a normal sun gear, a compound sun gear, a first ring gear, a long set of planetary pinions meshing with the compound sun gear, a short set of planetary pinions meshing with the normal sun gear and the long set of planetary pinions, and a first planetary carrier common to both the long and short set of planetary pinions. The simple planetary gear set includes a sun gear, a second ring gear, and a second planetary pinion rotatably mounted on a second planetary carrier, wherein the second planetary pinion is disposed in a meshing relationship with the sun and second ring gear.

Optionally, the first and second electric motors are disposed in front of the simple and Ravigneaux-type planetary-gear sets. The connections in this option include the input shaft connected to the first planetary carrier, the first electric motor connected to the normal sun gear, the second electric motor connect to the sun gear, the sun gear connected to the transmission housing through the first selectively engageable brake, to the first electric motor, to the compound sun gear, and to the second ring gear through the first selectively engageable clutch, the second ring gear connected to the transmission housing through the second selectively engageable brake, the second planetary carrier connected to the output shaft, the compound sun gear connected to the first ring gear through the first selectively engageable clutch, and the first ring gear connected to the output shaft through the second selectively engageable clutch.

Alternatively, the first and second electric motors are disposed in between the simple and Ravigneaux-type planetary gear sets. The connections in this alternative include the input shaft connected to the first ring gear, the first electric motor connected to the compound sun gear, the second electric motor connect to the sun gear and the normal sun gear, the compound sun gear connected to the first ring gear through the first selectively engageable clutch, the first planetary carrier connected to the output shaft through the second selectively engageable clutch, the sun gear connected to the transmission housing through the first selectively engageable brake, to the second electric motor, and to the normal sun gear, the second ring gear connected to the transmission housing through the second selectively engageable brake, and the second planetary carrier connected to the output shaft.

BRIEF DESCRIPTION OF THE DRAWINGS

The present disclosure is illustrated and described herein with reference to the various drawings, in which like reference numbers denote like system components, respectively, and in which.

DETAILED DESCRIPTION OF THE DISCLOSURE

In various exemplary embodiments, the present disclosure provides a power split transmission with two Electric Variable Transmission (EVT) modes and four fixed gears for use in hybrid electrical vehicles (HEV). The present disclosure utilizes two electric motors ("E-motors"), an engine, three planetary gear sets, and four selectively engageable clutches. The clutches are engaged in different combinations to engage the different gears and EVT modes. In the four fixed gears, power is transmitted only on the mechanical path for the highest transmission efficiency. In the two EVT modes, a part of the power is transmitted electrically. Alternatively, the E-motors can be located in the middle integrated with the transmission design. Advantageously, the present invention works with lower component speeds than existing two-mode hybrid transmissions. This can be achieved with a front E-motor design enabling modularity and also with a center E-motor design.

The present disclosure provides two forward EVT modes and four fixed gears to enable both an optimal fuel efficiency and excellent performance. Generally, EVT modes are more efficient in low load operation, such as for city driving. Fixed gears are more efficient for higher load operation. The present disclosure utilizes four clutches and three planetary gear sets to provide the two EVT modes and four fixed gears. The two EVT modes are designed to cover any ratio, i.e. full coverage. The four fixed gears are designed to not cover as many ratios, and are generally used at full and high loads.

The various exemplary embodiments of the multi-mode power split transmission with two EVT modes and four fixed gears are illustrated in various transmission schematic diagrams (also known as transmission stick diagrams). These schematic diagrams illustrate the topology, packaging, and location of planetary gear sets, clutches, motors, shafts, and the like. The schematic diagram is a visual representation of a cross-section of a transmission showing positioning and in what manner components are supported and interconnected. Additionally, the schematic diagrams show how various clutches and brakes are positioned and supported between or adjacent to planetary gear sets. Those of ordinary skill in the art recognize the schematic diagrams correspond to actual implementations of planetary gear sets, engines, clutches, and the like.

Figure 1:
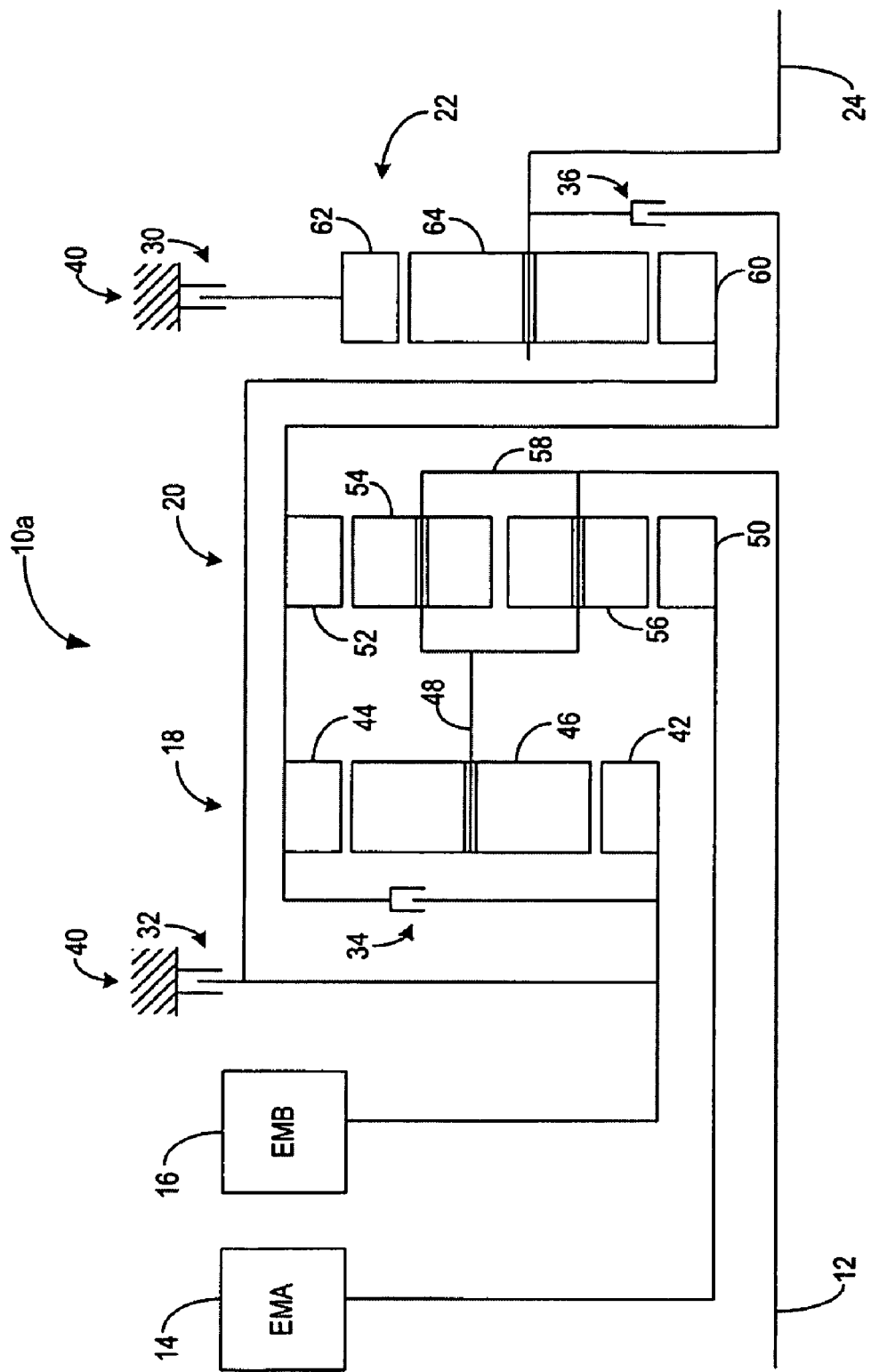
FIG. 1 is a schematic diagram of a power split transmission including two E-motors located in front of three planetary gear sets according to an exemplary embodiment of the present disclosure.

Referring to FIG. 1, a power split transmission 10*a* includes an input shaft 12, a first E-motor ("EMA") 14, a second E-motor ("EMB") 16, a first planetary gear set 18, a second planetary gear set 20, a third planetary gear set 22, and an output shaft 24, according to an exemplary embodiment of the present disclosure. The input shaft 12 can be connected to an engine, such as an internal combustion engine. The engine is configured to provide mechanical power to the input shaft 12. The output shaft 24 can connect to a vehicle's wheels, for example. The EMA 14 and EMB 16 are configured for motoring and generating in order to operate the transmission in variable ratios in different EVT modes.

The power split transmission 10*a* includes two brakes 30 and 32 and two clutches 34, and 36 which are torque transmitting mechanisms. The brakes 30 and 32 and clutches 34, and 36 are configured to selectively engage and disengage to select fixed gear ratios and EVT modes. For example, all single and double shifts can be performed by shifting from one brake or clutch 30, 32, 34, and 36 to another. The brakes and clutches 30, 32, 34, and 36 are configured to be selectively engaged, and can be operated mechanically, electrically, or hydraulically, as is known in the art. The brakes 30 and 32 are configured to connect to a transmission housing 40. The brakes and clutches 30, 32, 34, and 36 are configured to hold various components in the planetary gear sets 18, 20, and 22 to engage various gear ratios.

In this exemplary embodiment, the first and third planetary gear sets 18 and 22 are simple planetary gear sets, and the second-planetary gear set 20 is a compound planetary gear set. The first planetary gear set 18 includes a sun gear 42, a ring gear 44, a planetary pinion 46, and a planetary carrier 48. The planetary pinion 46 is rotatably mounted on the planetary carrier 48 disposed in a meshing relationship with the sun gear 42 and the ring gear 40.

The second planetary gear set 20 includes a sun gear 50, a ring gear 52, planetary pinions 54 and 56, and a planetary carrier 58. The planetary pinions 54 and 56 are rotatably mounted on the planetary carrier 58 disposed in a meshing relationship with the sun gear 50 and the ring gear 52. The third planetary gear set 22 includes a sun gear 60, a ring gear 62, a planetary pinion 64, and a planetary carrier 66. The planetary pinion 64 is rotatably mounted on the planetary carrier 66 disposed in a meshing relationship with the sun gear 60 and the ring gear 62.

The power split transmission 10*a* includes a front E-motor design with the EMA 14 and EMB 16 located in front of the three planetary gear sets 18, 20, and 22. This allows the EMA 14 and EMB 16 to be assembled separately from the three planetary gear sets 18, 20, and 22 leading to a modular design. For example, the modular design enables separate manufacturing of the gear sets 18, 20, and 22 from the E-motors 14 and 16.

With regards to the connections in the planetary gear set 18, the sun gear 42 is connected to the EMB 16, to the transmission housing 40 through the brake 32, and to the ring gear 44 through the clutch 34. The ring gear 44 is connected to the ring gear 52 of the second planetary gear set 20. The planetary carrier 48 is connected to the planetary carrier 58 of the second planetary gear set 20. With regards to the connections in the second planetary gear set 20, the sun gear 50 is connected to the EMA 14. The ring gear 52 is connected to the ring gear and to the output shaft 24 through the clutch 36. The planetary carrier 58 is connected to the input shaft 12. With regards to connections in the third planetary gear set 22, the sun gear 60 is connected the transmission housing 40 through the brake 32. The ring gear 62 is connected to the transmission housing 40 through the brake 30. The planetary carrier 64 is connected to the output shaft 24.

Figure 2:
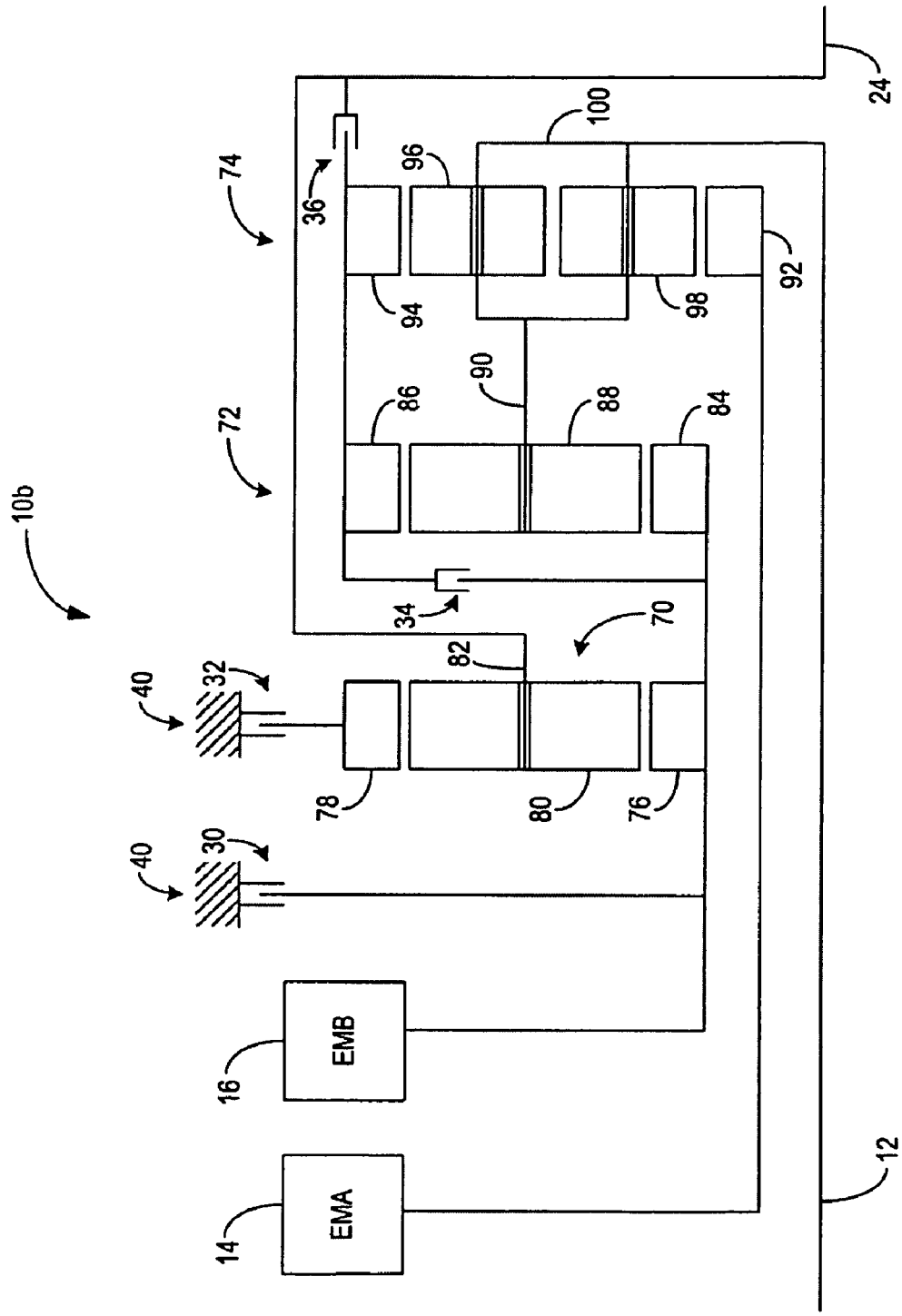
FIG. 2 is a schematic diagram of a power split transmission including two E-motors located in front of three planetary gear sets according to another exemplary embodiment of the present disclosure.

Referring to FIG. 2, a power split transmission 10*b* includes the input shaft 12, EMA 14, EMB 16, a first planetary gear set 70, a second planetary gear set 72, a third planetary gear set 74, and the output shaft 24, according to an exemplary embodiment of the present disclosure. The input shaft 12 can be connected to an engine, such as an internal combustion engine. The engine is configured to provide mechanical power to the input shaft 12. The output shaft 24 can connect to a vehicle's wheels, for example. The EMA 14 and EMB 16 are configured to generate and store power and to drive in variable ratios in different EVT modes.

The power split transmission 10*b* includes two brakes 30 and 32 and two clutches 34, and 36 which are torque transmitting mechanisms. The brakes and clutches 30, 32, 34, and 36 are configured to selectively engage and disengage to select fixed gear ratios and EVT modes. For example, all single and double shifts can be performed by shifting from one brake or clutch 30, 32, 34, and 36 to another. The brakes and clutches 30, 32, 34, and 36 are configured to be selectively engaged, and can be operated mechanically, electrically, or hydraulically, as is known in the art. The brakes 30 and 32 are configured to connect to a transmission housing 40. The brakes and clutches 30, 32, 34, and 36 are configured to hold various components in the planetary gear sets 70, 72, and 74 to engage various gear ratios.

In this exemplary embodiment, the first and second planetary gear sets 70 and 72 are simple planetary gear sets, and the third planetary gear set 74 is a compound planetary gear set. The first planetary gear set 70 includes a sun gear 76, a ring gear 78, a planetary pinion 80, and a planetary carrier 82.

The planetary pinion 80 is rotatably mounted on the planetary carrier 82 disposed in a meshing relationship with the sun gear 76 and the ring gear 78.

The second planetary gear set 72 includes a sun gear 84, a ring gear 86, a planetary pinion 88, and a planetary carrier 90. The planetary pinion 88 is rotatably mounted on the planetary carrier 90 disposed in a meshing relationship with the sun gear 84 and the ring gear 86. The third planetary gear set 74 includes a sun gear 92, a ring gear 94, planetary pinions 96 and 98, and a planetary carrier 100. The planetary pinions 96 and 98 are rotatably mounted on the planetary carrier 100 disposed in a meshing relationship with the sun gear 92 and the ring gear 94.

The power split transmission 10b includes a front E-motor design with the EMA 14 and EMB 16 located in front of the three planetary gear sets 70, 72, and 74. This allows the EMA 14 and EMB 16 to be assembled separately from the three planetary gear sets 70, 72, and 74 leading to a modular design. For example, the modular design enables separate manufacturing of the gear sets 70, 72, and 74 from the E-motors 14 and 16.

With regards to the connections in the planetary gear set 70, the sun gear 76 is connected to the EMB 16, to the transmission housing 40 through the brake 30, to the sun gear 84 of the second planetary gear set 72, and to the ring gear 86 of the second planetary gear set 72 through the clutch 34. The ring gear 78 is connected to the transmission housing 40 through the brake 32. The planetary carrier 82 is connected to the output shaft 24. With regards to the connections in the planetary gear set 72, the sun gear 86 is connected to the sun gear 76 and to the ring gear 86 through the clutch 34. The ring gear 86 is connected to the ring gear 94 of the third planetary gear set 74. The planetary carrier 90 is connected to the planetary carrier 100 of the third planetary gear set 74. With regards to the connections in the planetary gear set 74, the sun gear 94 is connected to the EMA 12. The ring gear 94 is connected to the ring gear 86 and to the output shaft 24 through the clutch 36. The planetary carrier 100 is connected to the input shaft 12.

Both, the power split transmissions 10a and 10b both support two forward EVT modes and four fixed gears through various engagements of the clutches 30, 32, 34, and 36. The two EVT modes have very low power split rations allowing very low powered E-motors and power electronics. The four fixed gears are well-distributed for high transmission efficiency, such as during high loads. Each of the power split transmissions 10a and 10b include a simple stick diagram for better packaging.

Each of the planetary gear sets 18, 20, 22, 70, 72, and 74 can be set to have ratios between 2.0 and 3.0. The power split transmissions 10a and 10b utilize the same gear ratios and EVT modes. Alternatively, the first two planetary gear sets 18, 20 and 70, 72 in both the power split transmissions 10a and 10b could be replaced with one compound planetary gear set, such as a Ravigneaux-type gear set or the like.

Figure 3:
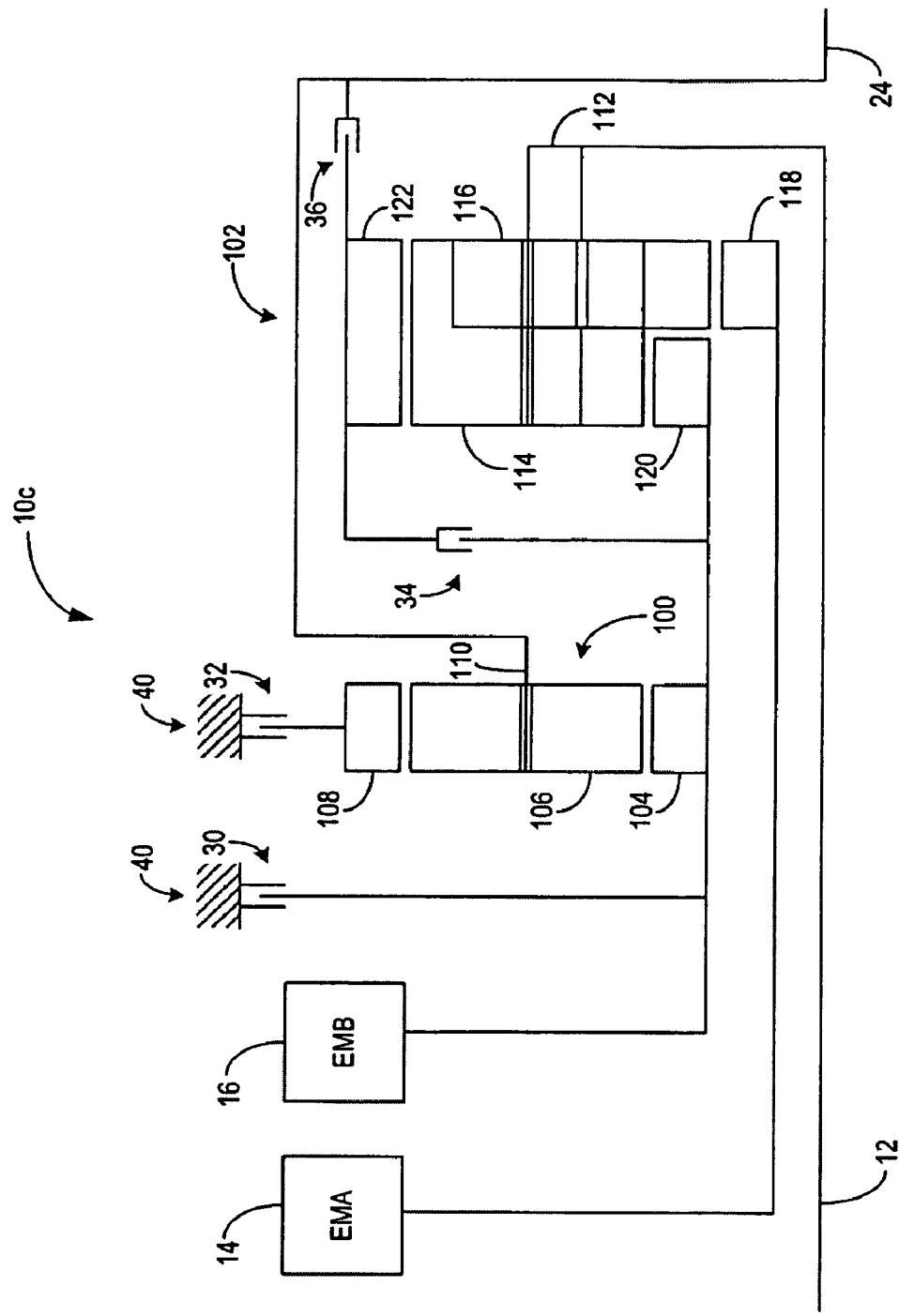
FIG. 3 is a schematic diagram of a power split transmission including two E-motors located in front of two planetary gear sets according to a further exemplary embodiment of the present disclosure.

Referring to FIG. 3, a power split transmission 10c includes the input shaft 12, EMA 14, EMB 16, a first planetary gear set 100, a second planetary gear set 102, and the output shaft 24, according to an exemplary embodiment of the present, disclosure. The input, shaft 12 can be connected to an engine, such as an internal combustion engine. The engine is configured to provide mechanical power to the input shaft 12. The output shaft 24 can connect to a vehicle's wheels, for example. The EMA 14 and EMB 16 are configured to generate and store power and to drive in variable ratios in different EVT modes.

The power split transmission 10c provides two forward EVT modes and four fixed gears similar to the power split transmission 10a and 10b. However, the power split transmission 10c utilizes a Ravigneaux-type (RGS) planetary gear set in place of two simple planetary gear sets. This provides a simpler transmission stick diagram leading to better packaging. The planetary gear set 100 is a simple planetary gear set, and the planetary gear set 102 is a dual-sun RGS planetary gear set.

The power split transmission 10c includes two brakes 30 and 32 and two clutches 34, and 36 which are torque transmitting mechanisms. The brakes and clutches 30, 32, 34, and 36 are configured to selectively engage and disengage to select fixed gear ratios and EVT modes. For example, all single and double shifts can be performed by shifting from one brake or clutch 30, 32, 34, and 36 to another. The brakes and clutches 30, 32, 34, and 36 are configured to be selectively engaged, and can be operated mechanically, electrically, or hydraulically, as is known in the art. The brakes 30 and 32 are configured to connect to a transmission housing 40. The brakes and clutches, 30, 32, 34, and 36 are configured to hold various components in the planetary gear sets 100 and 102 to engage various gear ratios.

The power split transmission 10c includes a front E-motor design with the EMA 14 and EMB 16 located in front of the planetary gear sets 100 and 102. This allows the EMA 14 and EMB 16 to be assembled separately from the planetary gear sets 100 and 102 leading to a modular design. For example, the modular design enables separate manufacturing of the gear sets 100 and 102 from the E-motors 14 and 16.

The first planetary gear set 100 includes a sun gear 104, a ring gear 106, a planetary pinion 108, and a planetary carrier 110. The planetary pinion 108 is rotatably mounted on the planetary carrier 110 disposed in a meshing relationship with the sun gear 104 and the ring gear 106. The second planetary gear set 102 includes a planetary carrier 112, a long set of planetary pinions 114, a short set of planetary pinions 116, a normal sun gear 118, a compound sun gear 120, and a ring gear 122. The planetary carrier 112 is common to the long and short set of planetary pinions 114 and 116. The long set of planetary pinions 114 have a smaller diameter, but longer length than the short set of planetary pinions 116. The long set of planetary pinions 114 mesh with the compound sun gear 120, and the short set of planetary pinions 116 mesh with the normal sun gear 118 and the long set of planetary pinions 114.

With regards to the connections in the planetary gear set 100, the sun gear 104 connects to the EMB 16, to the transmission housing 40 through the brake 30, to the compound sun gear 120, and to the ring gear 122 through the clutch 34. The ring gear 108 connects to the transmission housing 40 through the brake 32. The planetary carrier 110 connects to the output shaft 24. With regards to the connections in the planetary gear set 102, the normal sun gear 118 connects to the EMA 14. The compound sun gear 120 connects to the sun gear 104 and to the ring gear 122 through the clutch 34. The ring gear 122 connects to the compound sun gear 120 through the clutch 34 and to the output shaft 24 through the clutch 36. The planetary carrier 112 connects to the input shaft 24.

Figure 4:
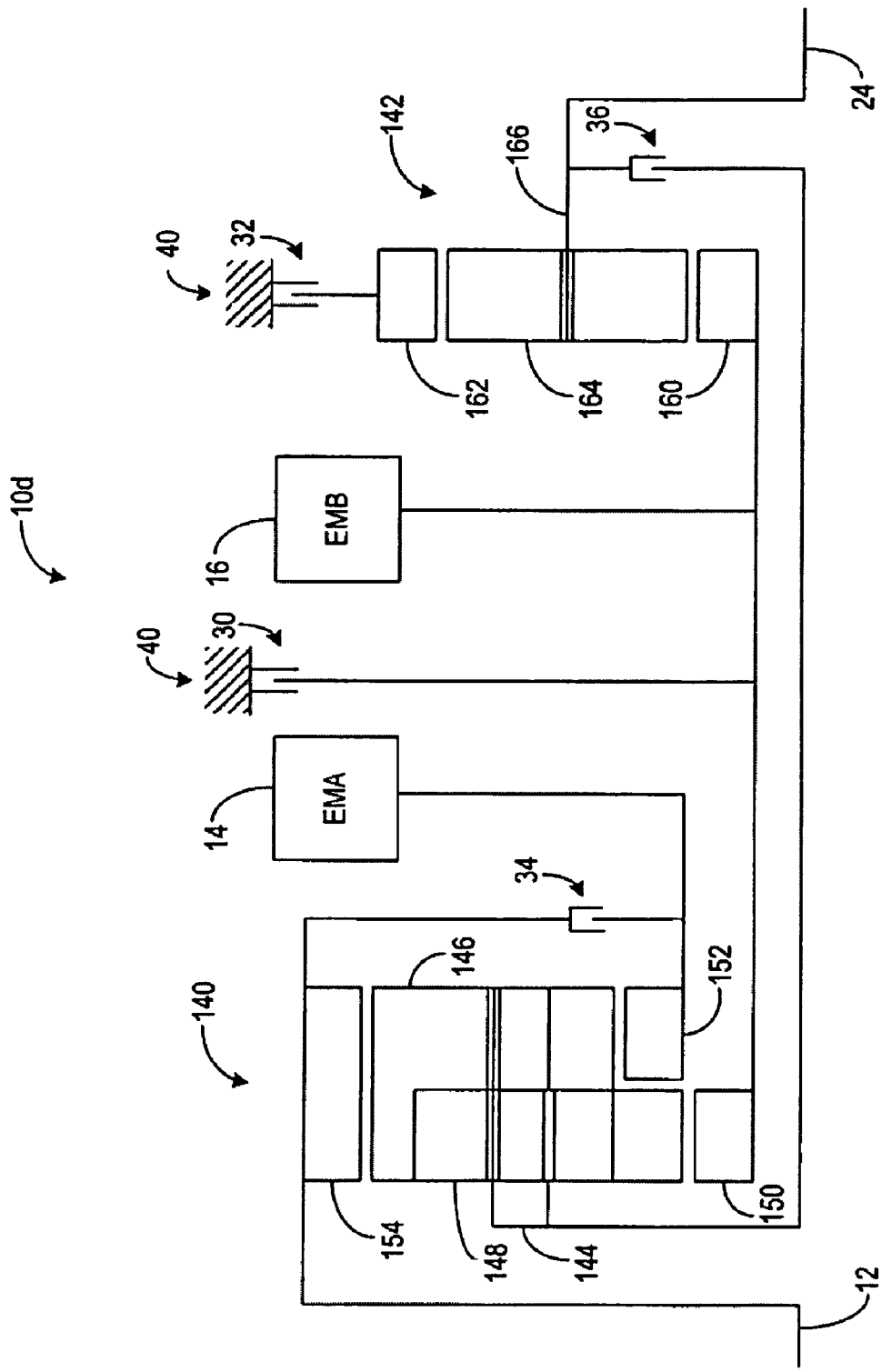
FIG. 4 is a schematic diagram of a power split transmission including two E-motors located in between two planetary gear sets according to yet another exemplary embodiment of the present disclosure.

Referring to FIG. 4, a power split transmission 10d includes the input shaft 12, EMA 14, EMB 16, a first planetary gear set 140, a second planetary gear set 142, and the output shaft 24, according to an exemplary embodiment of the present disclosure. The input shaft 12 can be connected to an engine, such as an internal combustion engine. The engine is configured to provide mechanical power to the input shaft 12. The output shaft 24 can connect to a vehicle's wheels, for example. The EMA 14 and EMB 16 are configured to generate and store power and to drive in variable ratios in different EVT modes.

The power split transmission 10d provides two forward EVT modes and four fixed gears similar to the power split transmission 10a and 10b. However, the power split transmission 10d utilizes a Ravigneaux-type (RGS) planetary gear set in place of two simple planetary gear sets. This provides a simpler transmission stick diagram leading to better packaging. The planetary gear set 142 is a simple planetary gear set, and the planetary gear set 142 is a dual-sun RGS planetary gear set. The power split transmission 10d includes a middle E-motor design with the EMA 14 and EMB 16 located in between the planetary gear sets 140 and 142.

The power split transmission 10d includes two brakes 30 and 32 and two clutches 34, and 36 which are torque transmitting mechanisms. The brakes and clutches 30, 32, 34, and 36 are configured to selectively engage and disengage to select fixed gear ratios and EVT modes. For example, all single and double shifts can be performed by shifting from one brake or clutch 30, 32, 34, and 36 to another. The brakes and clutches 30, 32, 34, and 36 are configured to be selectively engaged, and can be operated mechanically, electrically, or hydraulically, as is known in the art. The brakes 30 and 32 are configured to connect to a transmission housing 40. The brakes and clutches 30, 32, 34, and 36 are configured to hold various components in the planetary gear sets 140 and 142 to engage various gear ratios.

The first planetary gear set 140 includes a planetary carrier 144, a long set of planetary pinions 146, a short set of planetary pinions 148, a normal sun gear 150, a compound sun gear 152, and a ring gear 154. The planetary carrier 144 is common to the long and short set of planetary pinions 146, and 148. The long set of planetary pinions 146 have a smaller diameter, but longer length than the short set of planetary pinions 148. The long set of planetary pinions 146 mesh with the compound sun gear 152, and the short set of planetary pinions 148 mesh with the normal sun gear 150 and the long, set of planetary pinions 146. The second planetary gear set 142 includes a sun gear 160, a ring gear 162, a planetary pinion 164, and a planetary carrier 166. The planetary pinion 164 is rotatably mounted on the planetary carrier 166 disposed in a meshing relationship with the sun gear 160 and the ring gear 162.

With regards to the connections in the planetary gear set 140, the normal sun gear 150 connects to the EMB 16, to the transmission housing through the brake 30, and to the sun gear 160. The compound sun gear 152 connects to the ring gear 154 through the clutch 34 and to the EMA 14. The ring gear 154 connects to the input shaft 12 and to the compound sun gear 152 through the clutch 34. The planetary carrier 144 connects to the output shaft 24 through the clutch 36. With regards to the connections in the planetary gear set 142, the sun gear connects to the EMB 16, to the transmission housing 40 through the brake 30, and to the normal sun gear 150. The ring gear 162 connects to the transmission housing 40 through the brake 32. The planetary carrier 166 connects to the output shaft 24.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An electric variable transmission with two forward modes and four fixed gears, comprising:
   a first, second, and third planetary gear set, wherein the first, second, and third planetary gear sets are interconnected;
   an input shaft directly connected to a planetary carrier of the second planetary gear set;
   a first electric motor connected to the second planetary gear set;
   a second electric motor connected to the first planetary gear set;
   a transmission housing connected to the first planetary gear set through a first selectively engageable brake and to the third planetary gear set through a second selectively engageable brake;
   a first selectively engageable clutch connected within the first planetary gear set;
   a second selectively engageable clutch connected within the third planetary gear set; and
   an output shaft connected to the third planetary gear set.

2. The electric variable transmission of claim 1, wherein the first and third planetary gear sets comprise a simple planetary gear set, and wherein the second planetary gear set comprises a compound planetary gear set.

3. The electric variable transmission of claim 2, wherein the first planetary gear set comprises a first sun gear, a first ring gear, and a first planetary pinion rotatably mounted on a first planetary carrier, wherein the first planetary pinion is disposed in a meshing relationship with the first sun and first ring gears;
   wherein the second planetary gear set comprises a second sun gear, a second ring gear, and second planetary pinions rotatably mounted on the second planetary carrier, wherein the second planetary pinions are disposed in a meshing relationship with the second sun and second ring gears; and
   wherein the third planetary gear set comprises a third sun gear, a third ring gear, and a third planetary pinion rotatably mounted on a third planetary carrier, wherein the third planetary pinion is disposed in a meshing relationship with the third sun and third ring gears.

4. The electric variable transmission of claim 3, wherein connections in the electric variable transmission comprise:
   the input shaft connected to the second planetary carrier;
   the first electric motor connected to the second sun gear;
   the second electric motor connected to the first sun gear;
   the first sun gear connected to the transmission housing through the first selectively engageable brake and to the first ring gear through the first selectively engageable clutch;
   the first ring gear connected to the second ring gear;
   the first planetary carrier connect to the second planetary carrier;
   the second ring gear connected to the output shaft through the second selectively engageable clutch;
   the second planetary carrier connected to the input shaft;
   the third sun gear connected to the transmission housing through the first selectively engageable brake;
   the third ring gear connected to the transmission housing through the second selectively engageable brake; and
   the third planetary carrier connected to the output shaft.

5. The electric variable transmission of claim 1, where in the first and second electric motors are disposed in front of the first, second, and third planetary gear sets.

6. The electric variable transmission of claim 1, wherein the electric variable transmission comprises two electric variable transmission modes and four fixed gears; and
   wherein the two electric variable transmission modes and four fixed gears are selectively engageable through the first and second selectively engageable brakes and the first and second selectively engageable clutches.

7. An electric variable transmission with two forward modes and four fixed gears, comprising:
- a first, second, and third planetary gear set, wherein the first, second, and third planetary gear sets are interconnected;
- an input shaft connected to the third planetary gear set;
- a first electric motor connected to the third planetary gear set;
- a second electric motor directly connected to the first and second planetary gear sets;
- a transmission housing connected to the first planetary gear set through a first and second selectively engageable brake;
- a first selectively engageable clutch connected within the second planetary gear set; and
- an output shaft connected to the first planetary gear set and to the third planetary gear set through a second selectively engageable clutch.

8. The electric variable transmission of claim 7, wherein the first and second planetary gear sets comprise a simple planetary gear set, and wherein the third planetary gear set comprises a compound planetary gear set.

9. The electric variable transmission of claim 8, wherein the first planetary gear set comprises a first sun gear, a first ring gear, and a first planetary pinion rotatably mounted on a first planetary carrier, wherein the first planetary pinion is disposed in a meshing relationship with the first sun and first ring gears;
- wherein the second planetary gear set comprises a second sun gear, a second ring gear, and a second planetary pinion rotatably mounted on a second planetary carrier, wherein the second planetary pinion is disposed in a meshing relationship with the second sun and second ring gears; and
- wherein the third planetary gear set comprises a third sun gear, a third ring gear, and third planetary pinions rotatably mounted on a third planetary carrier, wherein the third planetary pinions are disposed in a meshing relationship with the third sun and third ring gears.

10. The electric variable transmission of claim 9, wherein connections in the electric variable transmission comprise:
- the input shaft connected to the third planetary carrier;
- the first electric motor connected to the third sun gear;
- the second electric motor connected to the first sun gear;
- the first sun gear connected to the second sun gear, the second ring gear through the first selectively engageable clutch, and the transmission housing through the first selectively engageable brake;
- the first ring gear connected to the transmission housing through the second selectively engageable brake;
- the first planetary carrier connected to the output shaft;
- the second sun gear connected to the first sun gear and to the second ring gear through the first selectively engageable clutch;
- the second ring gear connected to the third ring gear;
- the second planetary carrier connected to the third planetary carrier; and
- the third ring gear connected to the output shaft through the second selectively engageable clutch.

11. The electric variable transmission of claim 7, wherein the first and second electric motors are disposed in front of the first, second, and third planetary gear sets.

12. The electric variable transmission of claim 7, wherein the electric variable transmission comprises two electric variable transmission modes and four fixed gears; and
wherein the two electric variable transmission modes and four fixed gears are selectively engageable through the first and second selectively engageable brakes and the first and second selectively engageable clutches.

13. An electric variable transmission with two forward modes and four fixed gears utilizing a Ravigneaux-type planetary gear set, comprising:
- a Ravigneaux-type-planetary gear set;
- a simple planetary gear set;
- an input shaft connected to the Ravigneaux-type planetary gear set;
- a first electric motor connected to the Ravigneaux-type planetary gear set;
- a second electric motor connected to the Ravigneaux-type planetary gear set and the simple planetary gear set;
- a transmission housing connected to the simple planetary gear set through a first and second selectively engageable brake;
- a first selectively engageable clutch connected within the Ravigneaux-type planetary gear set; and
- an output shaft connected to the simple planetary gear set and selectively connected to the Ravigneaux-type planetary gear set through a second selectively engageable clutch.

14. The electric variable transmission of claim 13, wherein the Ravigneaux-type planetary gear set comprises a normal sun gear, a compound sun gear, a first ring gear, a long set of planetary pinions meshing with the compound sun gear, a short set of planetary pinions meshing with the normal sun gear and the long set of planetary pinions, and a first planetary carrier common to both the long and short set of planetary pinions; and
- wherein the simple planetary gear set comprises a sun gear, a second ring gear, and a second planetary pinion rotatably mounted on a second planetary carrier, wherein the second planetary pinion is disposed in a meshing relationship with the sun and second ring gear.

15. The electric variable transmission of claim 14, wherein the first and second electric motors are disposed in front of the simple and Ravigneaux-type planetary gear sets.

16. The electric variable transmission of claim 15, wherein connections in the electric variable transmission comprise:
- the input shaft connected to the first planetary carrier;
- the first electric motor connected to the normal sun gear;
- the second electric motor connect to the sun gear;
- the sun gear connected to the transmission housing through the first selectively engageable brake, to the first electric motor, to the compound sun gear, and to the second ring gear through the first selectively engageable clutch;
- the second ring gear connected to the transmission housing through the second selectively engageable brake;
- the second planetary carrier connected to the output shaft;
- the compound sun gear connected to the first ring gear through the first selectively engageable clutch; and
- the first ring gear connected to the output shaft through the second selectively engageable clutch.

17. The electric variable transmission of claim 14, wherein the first and second electric motors are disposed in between the simple and Ravigneaux-type planetary gear sets.

18. The electric variable transmission of claim 17, wherein connections in the electric variable transmission comprise:
- the input shaft connected to the first ring gear;
- the first electric motor connected to the compound sun gear;
- the second electric motor connect to the sun gear and the normal sun gear;

the compound sun gear connected to the first ring gear through the first selectively engageable clutch;

the first planetary carrier connected to the output shaft through the second selectively engageable clutch;

the sun gear connected to the transmission housing through the first selectively engageable brake, to the second electric motor, and to the normal sun gear;

the second ring gear connected to the transmission housing through the second selectively engageable brake; and the second planetary carrier connected to the output shaft.

19. The electric variable transmission of claim 13, wherein the electric variable transmission comprises two electric variable transmission modes and four fixed gears; and wherein the two electric variable transmission modes and four fixed gears are selectively engageable through the first and second selectively engageable brakes and the first and second selectively engageable clutches.

* * * * *